United States Patent
Elko et al.

(10) Patent No.: US 8,942,382 B2
(45) Date of Patent: Jan. 27, 2015

(54) DYNAMIC BEAMFORMER PROCESSING FOR ACOUSTIC ECHO CANCELLATION IN SYSTEMS WITH HIGH ACOUSTIC COUPLING

(75) Inventors: Gary W. Elko, Summit, NJ (US); Tomas F. Gaensler, Warren, NJ (US); Eric J. Diethorn, Long Valley, NJ (US); Jens M. Meyer, Fairfax, VT (US)

(73) Assignee: MH Acoustics LLC, Summit, NJ (US)

( * ) Notice: Subject to any disclaimer, the term of this patent is extended or adjusted under 35 U.S.C. 154(b) by 362 days.

(21) Appl. No.: 13/426,761

(22) Filed: Mar. 22, 2012

(65) Prior Publication Data

US 2012/0243698 A1    Sep. 27, 2012

Related U.S. Application Data

(60) Provisional application No. 61/466,043, filed on Mar. 22, 2011.

(51) Int. Cl.
*H04B 3/20* (2006.01)
*H04M 9/08* (2006.01)

(52) U.S. Cl.
CPC ................................ *H04M 9/082* (2013.01)
USPC .......... 381/66; 381/92; 381/71.1; 381/95; 381/313; 455/569.1; 455/114.2; 379/406.01

(58) Field of Classification Search
CPC ............ H04R 3/005; H04R 3/02; H04R 3/12; H04R 25/402; H04R 25/405; H04R 25/407; H04R 25/43; H04R 25/45; H04R 25/453; H04R 2201/34; H04R 2201/40; H04R 2201/401; H04R 2201/403; H04R 2201/405; H04R 2203/00; H04R 2203/12; H04R 2225/49; H04R 2225/55; H04R 2227/001; H04R 2227/009; H04R 2400/01; H04R 2410/01; H04R 2410/05; H04R 2430/20; H04R 2430/21; H04R 2430/23; H04R 2430/25; H04R 2499/11; H04R 2499/13; H04R 2499/15; G01L 15/20; G01L 21/02; G01L 21/0208; G01L 21/0216; G01L 21/0224; G01L 21/0232; G01L 21/0264; G01L 21/0308; G01L 2021/02082
USPC .......... 381/66, 313, 317, 318, 320, 321, 71.1, 381/71.2, 71.3, 71.4, 71.5, 71.6, 71.7, 381/71.11, 71.12, 74, 79, 83, 86, 95, 91, 92, 381/93, 94.1, 96, 97, 98, 119, 121, 122; 455/569.1, 569.2, 570, 114.2, 136, 455/296, 297; 379/406.01–406.16; 700/94
See application file for complete search history.

(56) References Cited

U.S. PATENT DOCUMENTS 6,154,552 A * 11/2000 Koroljow et al. ............. 381/313
7,359,504 B1 * 4/2008 Reuss et al. ............. 379/406.02
(Continued)

Primary Examiner — Leshui Zhang
(74) Attorney, Agent, or Firm — Mendelsohn, Drucker & Dunleavy, P.C.; Steve Mendelsohn

(57) ABSTRACT

Near-end equipment for a communication channel with far-end equipment. The near-end equipment includes at least one loudspeaker, at least two microphones, a beamformer, and an echo canceller. The communication channel may be in one of a number of communication states including Near-End Only state, Far-End Only state, and Double-Talk state. In one embodiment, when the echo canceller determines that the communication channel is in either the Far-End Only state or the Double-Talk state, the beamformer is configured to generate a nearfield beampattern signal that directs a null towards a loudspeaker. When the echo canceller detects the Near-End Only state, the beamformer is configured to generate a farfield beampattern signal that optimizes reception of acoustic signals from the near-end audio source. Using different beamformer processing for different communication states allows echo cancellation processing to be more successful at reducing echo in the signal transmitted to the far-end equipment.

10 Claims, 5 Drawing Sheets

(56) References Cited

U.S. PATENT DOCUMENTS

2009/0003623 A1* 1/2009 Burnett ........................... 381/92
2009/0060222 A1* 3/2009 Jeong et al. .................... 381/92
2009/0164212 A1* 6/2009 Chan et al. .................... 704/226
2011/0038489 A1* 2/2011 Visser et al. .................... 381/92
2011/0063405 A1* 3/2011 Yam ........................... 348/14.08

* cited by examiner

DYNAMIC BEAMFORMER PROCESSING FOR ACOUSTIC ECHO CANCELLATION IN SYSTEMS WITH HIGH ACOUSTIC COUPLING

CROSS-REFERENCE TO RELATED APPLICATIONS

This application claims the benefit of the filing date of U.S. provisional application No. 61/466,043, filed on Mar. 22, 2011, the teachings of which are incorporated herein by reference in their entirety.

BACKGROUND

1. Field of the Invention

The present invention relates to audio signal processing and, more specifically but not exclusively, to echo cancellation techniques.

2. Description of the Related Art

This section introduces aspects that may help facilitate a better understanding of the invention. Accordingly, the statements of this section are to be read in this light and are not to be understood as admissions about what is prior art or what is not prior art.

As more and more products tend towards smaller and smaller size, and as hands-free communication applications grow, it has become common for product designers to place the acoustic transducers in very close proximity to each other. Having the microphones and loudspeakers in close proximity results in high acoustic coupling that can severely compromise the duplex quality of a full-duplex audio communication channel. The main reason for this compromise is related to the large acoustic-level difference between the nearby loudspeaker(s) signal and the desired local acoustic signal (talker) at the microphone(s). A larger disparity in these two acoustic levels can lead to poor double-talk detection, reduced duplexness in the audio communication channel, and a susceptibility to audible artifacts caused by loudspeaker distortion. Acoustic echo cancellers are typically based on the assumption that the acoustic coupling path is linear. Thus, loudspeaker distortion cannot be cancelled by a linear echo canceller, resulting in poor duplex performance.

SUMMARY

Problems in the prior art are addressed by the use of a dynamic beamformer in conjunction with acoustic echo cancellation for systems that have high acoustic coupling. The algorithm described herein is focused on how to approach the closely coupled acoustic transducer acoustic echo cancellation problem.

In one embodiment, the present invention is user equipment for a near-end user communicating with a far-end user via an audio communication channel. The user equipment comprises a beamformer and an echo canceller. The beamformer is configured to receive two or more microphone signals generated by two or more local microphones and generate one or more beampattern signals. The echo canceller is configured to (i) receive the one or more beampattern signals from the beamformer and an incoming signal from the far-end user that is applied to one or more local loudspeakers, (ii) determine an active communication state for the audio communication channel, (iii) select a beampattern for the beamformer, and (iv) apply echo-cancellation processing to the beampattern signal corresponding to the selected beampattern for the beamformer to generate an outgoing signal to be transmitted to the far-end user for application to one or more remote loudspeakers.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In certain embodiments of the disclosure, a beamformer dynamically modifies its beampattern to greatly reduce loudspeaker and microphone acoustic coupling when either only the far-end user is talking or when the two users at both ends of an audio connection talk simultaneously (i.e., double-talk). When only the near-end user is talking, the beamformer is optimized to maximize the audio quality (e.g., maximize signal-to-noise ratio (SNR)) of the beamformer output for the near-end source. During sole far-end talker situations, having the beamformer reduce acoustic coupling allows the acoustic echo canceller to operate with better cancellation performance by greatly reducing the direct sound from the loudspeaker into the beamformer output.

Figure 1:
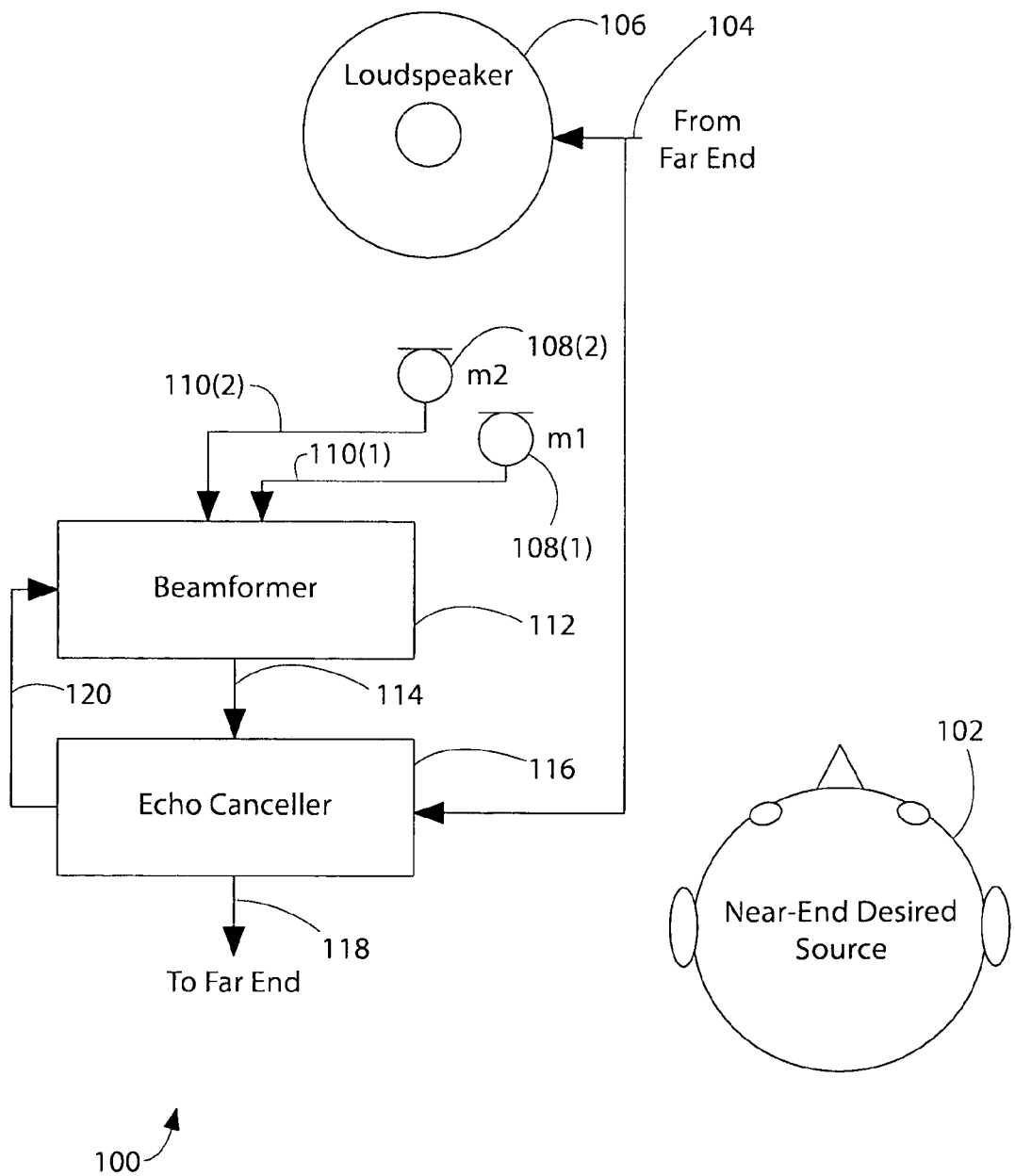
FIG. 1 shows a schematic block diagram of an audio system according to one embodiment of the disclosure.

FIG. 1 shows a schematic block diagram of an audio system 100 according to one embodiment of the disclosure. Audio system 100 represents one half of a two-way audio communication channel between a near-end user 102 and a far-end user (not shown). Audio system 100 receives an incoming (electrical or optical) signal 104 from the far-end user equipment (not shown), representing acoustic signals (i.e., sounds) occurring remotely at the far end, and audio system 100 generates an outgoing (electrical or optical) signal 118 for transmission to the far-end user equipment, representing acoustic signals occurring locally at the near end.

In particular, loudspeaker 106 converts incoming signal 104 received from the far-end user equipment into local acoustic signals (not shown) to be heard by near-end user 102, while microphones 108(1) and 108(2) convert local acoustic signals (not shown) (e.g., speech by near-end user 102) into electrical signals 110(1) and 110(2) that are used to generate outgoing signal 118 for transmission to the far-end user equipment. In a typical implementation, microphones 108 are omnidirectional microphones, although other implementations are possible, include those in which two different types of microphones are used for the two microphones. Note that the far-end user equipment will typically include an audio system that is another instance of audio system 100 or at least an audio system that is analogous to audio system 100 having one or more loudspeakers and one or more microphones.

Since acoustic signals generated by loudspeaker 106 can be picked up by microphones 108 as undesirable echo, audio system 100 has an echo canceller 116 that is designed to prevent some and possibly substantially all of that echo from being represented in outgoing signal 118.

As shown in FIG. 1, audio system 100 also has a beamformer 112 that processes electrical signals 110 generated by microphones 108 to generate a beampattern signal 114. Beamformer 112 can be implemented using a filter-sum configuration, in which each microphone output is filtered (e.g., using a finite impulse response (FIR) filter or an infinite impulse response (IIR) filter or a combination of FIR and IIR filters) followed by a summation node that sums the different filtered microphone signals to form beampattern signal 114. Each FIR/IIR filter is typically defined by a set of filter coefficients.

Echo canceller 116 compares beampattern signal 114 to a copy of or a portion of incoming signal 104 in order to control beamformer 112. In particular, echo canceller 116 compares incoming signal 104 and beampattern signal 114 to estimate the amount of acoustic coupling between loudspeaker 106 and microphones 108 and, depending on that estimated level of acoustic coupling, echo canceller 116 adaptively controls, via beamformer control signal 120, the processing implemented by beamformer 112. In addition, echo canceller 116 performs (e.g., adaptive) echo-cancellation processing on beampattern signal 114 to generate outgoing signal 118.

Note that, in general, audio system 100 may have other components that are not shown in FIG. 1, such as one or more upstream components that generate incoming signal 104 from a communication signal that is actually received from the far-end user equipment and/or one or more downstream components that process outgoing signal 118 to generate a communication signal that is actually transmitted to the far-end user equipment. In addition, audio system 100 may have one or more intermediate components that process some of the intermediate signals in audio system 100. For example, in an embodiment in which (i) microphones 108 generate analog electrical signals and (ii) beamformer 112 and echo canceller 116 are implemented in the digital domain, audio system 100 would typically have (a) amplifiers and filters that amplify and filter the analog electrical microphone output signals and (b) analog-to-digital converters (ADCs) that digitize the resulting analog signals for processing by digital beamformer 112.

In a typical two-user audio communication session, only one of four different possible communication states is active at any given time:
1. Near-End Only: Only the near-end user is speaking; the far-end user is silent;
2. Far-End Only: Only the far-end user is speaking; the near-end user is silent;
3. Double-Talk: Both the near-end user and the far-end user are speaking at the same time; and
4. Idle: Neither the near-end user nor the far-end user is speaking.

For the dual-element microphone array of FIG. 1, beamformer 112 can be configured to generate either a beampattern having no nulls or a beampattern having only a single wideband null. If microphones 108 are in the near field of loudspeaker 106, then the null can be designed to be a near-field null. In that case, the far-field pattern will be omnidirectional in shape and will not be able to attain the directional gain that a far-field design is capable of providing. Having an omnidirectional beampattern during far-end or double-talk conditions should not severely impact the acoustic performance of the speakerphone since, under these communication states, it is more important to reduce echo coupling than improve near-end audio quality with a directional far-field beamformer. Although forming a wideband spatial null towards the loudspeaker is desirable when the far-end user is talking (in either the Far-End Only state or the Double-Talk state), it is most likely suboptimal for a near-field acoustic signal source (e.g., when near-end user 102 is close to the microphones during either the Near-End Only state or the Double-Talk state). Thus, optimizing for rejection of the far-end source (i.e., minimizing the undesirable echo) in outgoing signal 118 might impair the quality of a close near-end source when only the near-end source is active during the Near-End Only state.

One way to effectively deal with this problem is to design beamformer 112 to support different beampatterns that are optimized for different situations. In one embodiment of audio system 100, beamformer 112 supports two different beampatterns: (1) a first beampattern designed to minimize the coupling of acoustic signals from loudspeaker 106 into beampattern signal 114 in order to maximize acoustic echo cancellation by echo canceller 116 and (2) a second beampattern designed to maximize the pickup of acoustic signals from near-end user 102. The first beampattern steers a null in the microphone beampattern towards loudspeaker 106, and the second beampattern maximizes the microphone beampattern in the direction of the near-end user.

The first beampattern may be a constrained optimization that forms a spatial null to the loudspeaker and uses any spare degrees of freedom to form the best available beam towards the near-end user. In addition, the second beampattern may be a constrained optimization that optimizes sound pick-up in the direction of the near-end user and uses any spare degrees of freedom to reduce sound pick-up from the loudspeaker. Such constrained first and second beampatterns would tend to reduce the penalties associated with mistakes in detecting the true state of the communication.

One possible enhancement to the microphone array beamformer would be to include another ancillary microphone embedded into the housing device and in the volume of air that is behind the loudspeaker. This ancillary microphone would only effectively be used while adapting the beamformer during the far-end only or double-talk modes of operation to minimize the coupling between the microphone array and the beamformer. By placing the microphone close to the back of the loudspeaker, the adaptive beamformer would automatically lower the weight on this microphone and thereby minimize its impact and contribution to the beamformer for near-end sources.

During the Far-End Only state and the Double-Talk state, it is useful for the beamformer to steer the microphone beam to place a null in the direction of the loudspeaker to enable the echo canceller to perform strong echo cancellation. As such, for these two states, the first beampattern is employed.

During the Near-End Only state and the Idle state, there is no need to generate a beampattern having any nulls. As such, for these two states, the second beampattern is employed. In an alternative implementation, for the Idle state, a third, omnidirectional beampattern is employed, which could result in a lower self-noise signal being transmitted as compared to a directional beampattern that trades-off directivity for self-noise.

Echo canceller 116 implements a state machine (shown in FIG. 2 and described below) that determines the active communication state in order to control beamformer 112 to generate the appropriate beampattern.

During the Double-Talk state, the beampattern is not optimized for the near-end source, but, when the conversation is in double talk, the far-end user equipment will perform analogous processing that will mask the audio signal being transmitted to it. As a result, the degradation in audio quality due to using the near-end beamformer not optimized to pick up the near-end audio will be partially masked by the double-talk scenario.

Echo canceller 116 processes beampattern signal 114 by subtracting a replica of the acoustic echo formed by filtering incoming signal 104 using a model of the acoustic path between loudspeaker 106 and microphones 108. The filtering operation and estimation of the acoustic path are done according to typically used acoustic echo cancellation techniques such as those presented in Benesty et al., *Advances in Network and Acoustic Echo Cancellation* (Berlin, Germany: Springer-Verlag, 2001). One way to filter the far-end signal and generate an echo estimate e(n) is to use a normalized least-mean squares (NLMS) based scheme as follows:

$$e(n) = y(n) - h^T(n-1)X(n)$$

$$h(n) = (n-1) + \mu \frac{X(n)e(n)}{(n)X(n)}$$

where X(n) is the regressor vector, y(n) is the beampattern signal 114, h(n) is the echo path model, and, μ is the step-size. The NLMS algorithm estimates the echo path by minimizing the power of the estimated echo e(n).

The current communication state for determining what beamformer processing to apply to the microphone signals can be determined by applying a voice activity detector (VAD) (not shown in FIG. 1) to incoming signal 104 (i.e., the far-end signal) and microphone signals 110 (i.e., the near-end signals). For an extensive description of VADs, see, e.g., 3GPP TS 26.094 V6.0.0 (2004-12), Technical Specification 3rd Generation Partnership Project.

Figure 2:
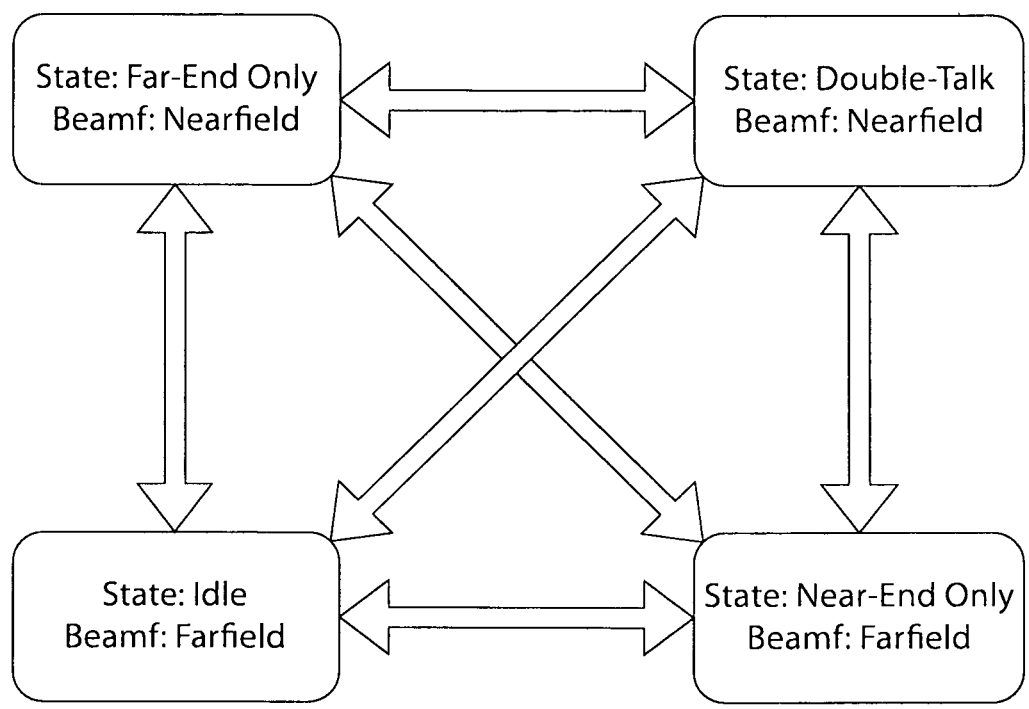
FIG. 2 is a state diagram showing the four communication states for the audio system of FIG. 1.

FIG. 2 is a state diagram showing the four communication states (Near-End Only, Far-End Only, Double-Talk, and Idle), the corresponding beamformer processing for each state, and the transitions between states for audio system 100 of FIG. 1. A basic method for determining the beamformer processing can be implemented as follows:

| | |
|---|---|
| Far_end_VAD | : Voice activity detector for far-end signal 104 |
| Near_end_VAD | : Voice activity detector for near-end signals 110 |
| Farfield-BF | : Farfield optimized beamformer processing |
| Nearfield-BF | : Nearfield optimized beamformer processing (e.g., nearfield null) |
| Omni-BF | : Omni-directional beamformer processing (not shown in FIG. 2) |
| if (Far_end_VAD) | // Far VAD active (Near-End Only or Double-Talk) |
| Beamformer = Nearfield-BF; | |
| else if (Near_end_VAD) | // Only near VAD active (Near-End Only) |
| Beamformer = Farfield-BF; | |
| else | // No VAD active (Idle) |
| Beamformer = Farfield-BF; // Alternative: Beamformer = Omni-BF; | |

Figure 3:
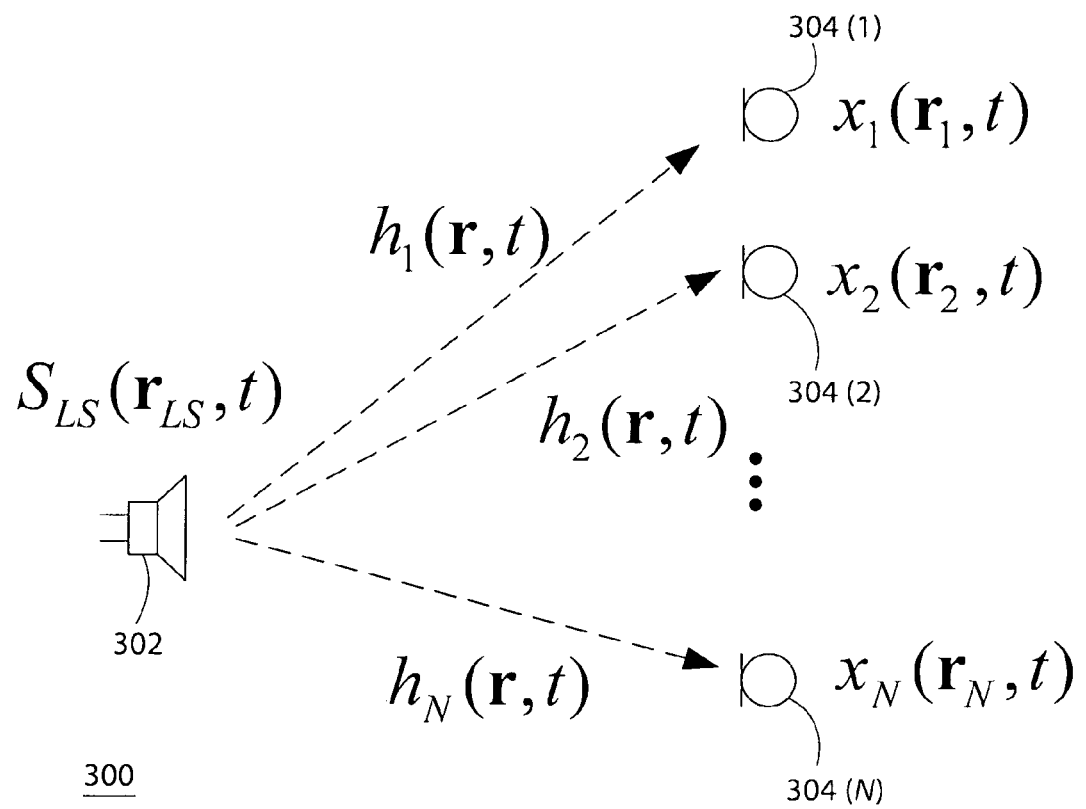
FIGS. 3 and 4 represent a speakerphone with a single loudspeaker and a beamformer with multiple microphones.
Figure 4:
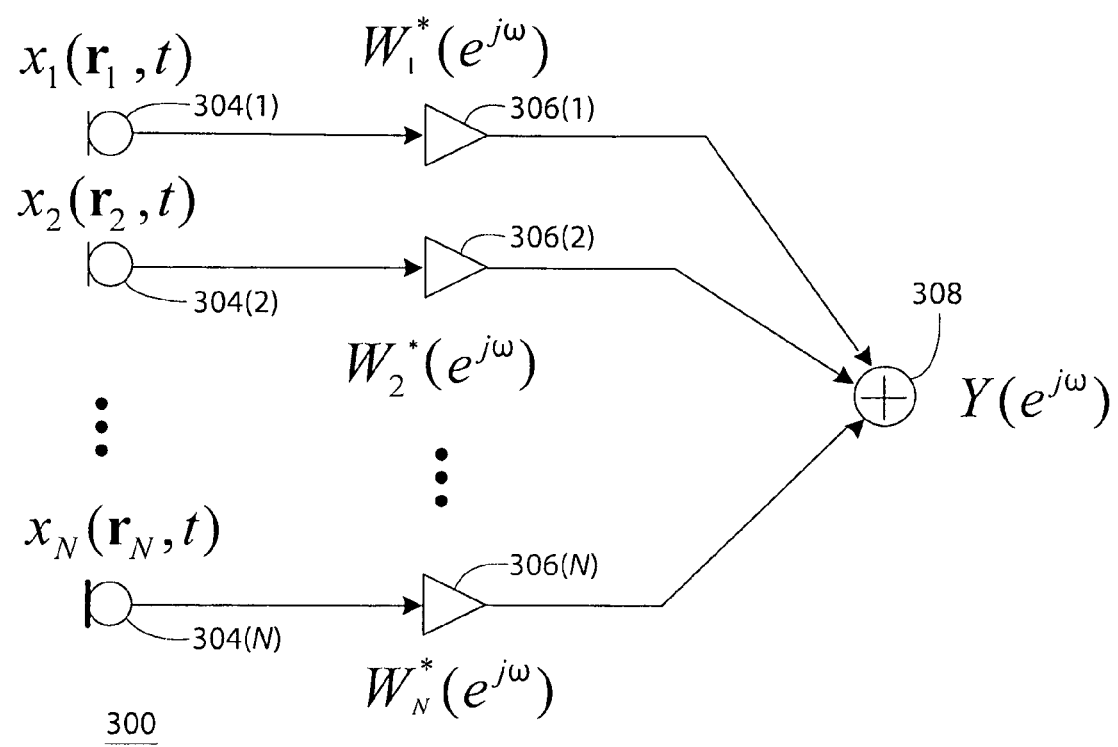

FIGS. 3 and 4 represent a speakerphone 300 with a single loudspeaker 302 and a beamformer (306, 308) with multiple microphones 304. The loudspeaker reproduces the audio signal from the far-end of an audio conference and is represented as the signal $S_{LS}(r_{LS}, t)$, where $r_{LS}$ is the position of the center of the loudspeaker, and t is time. FIGS. 3 and 4 show the possibility of N microphones at locations $r_i$ with related transfer functions $h_i(r_i, t)$.

To reduce the computational cost of realizing a full duplex speakerphone, the signal processing is normally done in the frequency domain. Switching to the frequency domain also simplifies the equations since it allows one to show the processing in a single band. As described earlier, the beamformer should adjust its beampattern such that the main coupling paths from the loudspeaker to the beamformer output are greatly reduced.

Note that, when operating in the frequency domain, the beamformer processing may be different for different frequency bands. For example, if one loudspeaker is a low-frequency loudspeaker, while another loudspeaker is a high-frequency loudspeaker, the beampattern selected for the low-frequency bands may direct a null towards the low-frequency loudspeaker, while the beampattern concurrently selected for the high-frequency bands may direct a null towards the high-frequency loudspeaker.

FIG. 4 shows the microphone beamforming array in the frequency domain at a single frequency (or frequency band). As can be seen in FIG. 4, each subband microphone signal is multiplied by a single complex weight $W_i^*(e^{j\omega})$ and then summed to form the beamformer output $Y(e^{j\omega})$ in that band. This representation is equivalent to the filter-sum beamformer in the time domain where the filters behind each microphone are FIR filters with variable weights. In a subband implementation, where each of the microphone time series in FIG. 4 is decomposed into multiple adjacent bands covering the entire bandwidth of audio processing, the single complex coefficient can be replaced by a more-general FIR filter for each subband, whose tap length can be adjusted depending on how long the desired filter is in time length. The microphone output vector $X(e^{j\omega})$ and the loudspeaker-to-microphone transfer function vector $H(e^{j\omega})$ can be written as follows:

$$X(e^{j\omega}) = [X_1(e^{j\omega}), X_2(e^{j\omega}), \ldots, X_N(e^{j\omega})]^T$$

$$H(e^{j\omega}) = [H_1(e^{j\omega}), H_2(e^{j\omega}), \ldots, H_N(e^{j\omega})]^T$$

and the output signal $Y(e^{j\omega})$ can be written as follows:

$$X(e^{j\omega}) = H(e^{j\omega})S(e^{j\omega}) + N(e^{j\omega})$$

$$Y(e^{j\omega}) = W^H(e^{j\omega})X(e^{j\omega})$$

where $S(e^{j\omega})$ is the Fourier transform of the loudspeaker signal in FIG. 3, $N(e^{j\omega})$ is the vector of the near-end desired signal as well as other background noise sources arriving at each microphone, and $W^H(e^{j\omega})$ is a vector of the complex, adaptive beamformer weights applied to the microphone signals.

One main objective for the nearfield beamformer is to significantly reduce the output of the picked-up far-end signal (i.e., the loudspeaker signal). Thus, it is desired to adjust the weights so that the beampattern has a spatial minimum directed to the loudspeaker, yet a flat frequency response to the desired far-field near-end talker, whose signal direction vector d is defined as follows:

$$d(e^{j\omega}) = [e^{-j\omega\tau_1}, e^{-j\omega\tau_2}, \ldots, e^{-j\omega\tau_N}]^T$$

where the values $\omega\tau_i$ are the associated phase delays required to steer the beampattern to the desired source direction.

The constrained optimization that minimizes the component of the loudspeaker signal $Sar_{LS}(r_{LS}, t)$ in the output of the beamformer while maintaining an essentially flat frequency response in the desired source direction can be written as follows:

$$w_o = \underset{w}{\operatorname{argmin}} w^H \tilde{S}_{xx} w, \text{ with } w^H d = 1$$

where $\tilde{S}_{xx}$ is the cross-spectral density matrix when only the loudspeaker signal is active and whose components are as follows:

$$\tilde{S}_{xx}(e^{j\omega})=E[\tilde{x}(e^{j\omega})\tilde{x}^H(e^{j\omega})]$$

where E is the expectation operator, and H is the Hermitian transpose operator. The hard constraint on the source direction response can be relaxed by allowing $w^H d \approx 1$, which leads to another possible solution. See, e.g., M. M. Sondhi and G. W. Elko, "Adaptive optimization of microphone arrays under a nonlinear constraint," Proc. IEEE ICASSP, p. 19.9.1, 1986.

Another possible optimization would be to limit the mean-square weights of the beamformer for robustness of the beam-forming to sensor mismatch and sensor self-noise. Writing this optimization equation yields the following:

$$w_o = \underset{w}{\operatorname{argmin}} w^H \tilde{S}_{xx} w, \text{ with } w^H w \leq M$$

where M is some limit that is imposed and is usually related to the number of microphones. The solution to this general problem falls into the domain of techniques used to solve a constrained quadratic program. See, e.g., S. Boyd and L. Vandenberghe, *Convex Optimization*, Cambridge University Press 2004.

The solution to the quadratic minimization problem for the linear constraint on the far-field desired source response is well known (see, e.g., H. Cox, R. M. Zeskind, and M. M. Owen, "Robust adaptive beamforming," IEEE Trans. Acoust., Speech, Signal Processing, vol. 35, pp. 1365-1376, October 1987, and O. L. Frost, III, "An algorithm for linearly constrained adaptive array processing," Proc. IEEE, vol. 60, pp. 926-935, August 1972) and can be written as follows:

$$w_o = \frac{\tilde{S}_{xx}^{-1} d}{d^H \tilde{S}_{xx}^{-1} d}$$

The matrix inverse required in the previous equation can often be poorly conditioned due to a large eigenvalue spread in the spectral density matrix. This is typically handled by diagonal loading of the matrix with a small value. There are many well-known adaptive algorithms (e.g., NLMS, Gradient Descent, RLS) that can solve the optimization problem, which can also be used to simplify the mathematical computation of the optimal weights. The adaptive LMS update equation in Frost is as follows:

$$w_{k+1} = w_k + \mu \left( I - \frac{dd^H}{d^H d} \right) \tilde{S}_{xx} w_k$$

Another important issue is that the weights can lead to a beamformer solution that is not robust to the nonideal nature of practical microphone arrays. To combat this problem, it is standard to also impose a "White-Noise-Gain" constraint (see, e.g., Cox et al.) which has the effect to limit the amount of desired signal power loss through the beamformer. The optimization equation above that has the quadratic constraint of the weights is related to the control of White-Noise-Gain. The quadratic weight norm constraint above is one way of controlling the White-Noise-Gain.

It should be noted that, if the loudspeaker is within the nearfield of the array (e.g., the distance between the center of the array and the loudspeaker is about the same as the size as the array), then placing a nearfield spatial minimum will result in a farfield beamformer that would tend towards a nondirectional pattern. In this case, one would probably not impose a farfield response constraint on the array, or would weight this constraint down in the overall power minimization cost function, so as to allow the array to adapt to attain higher attenuation to the nearfield loudspeaker.

Figure 5:
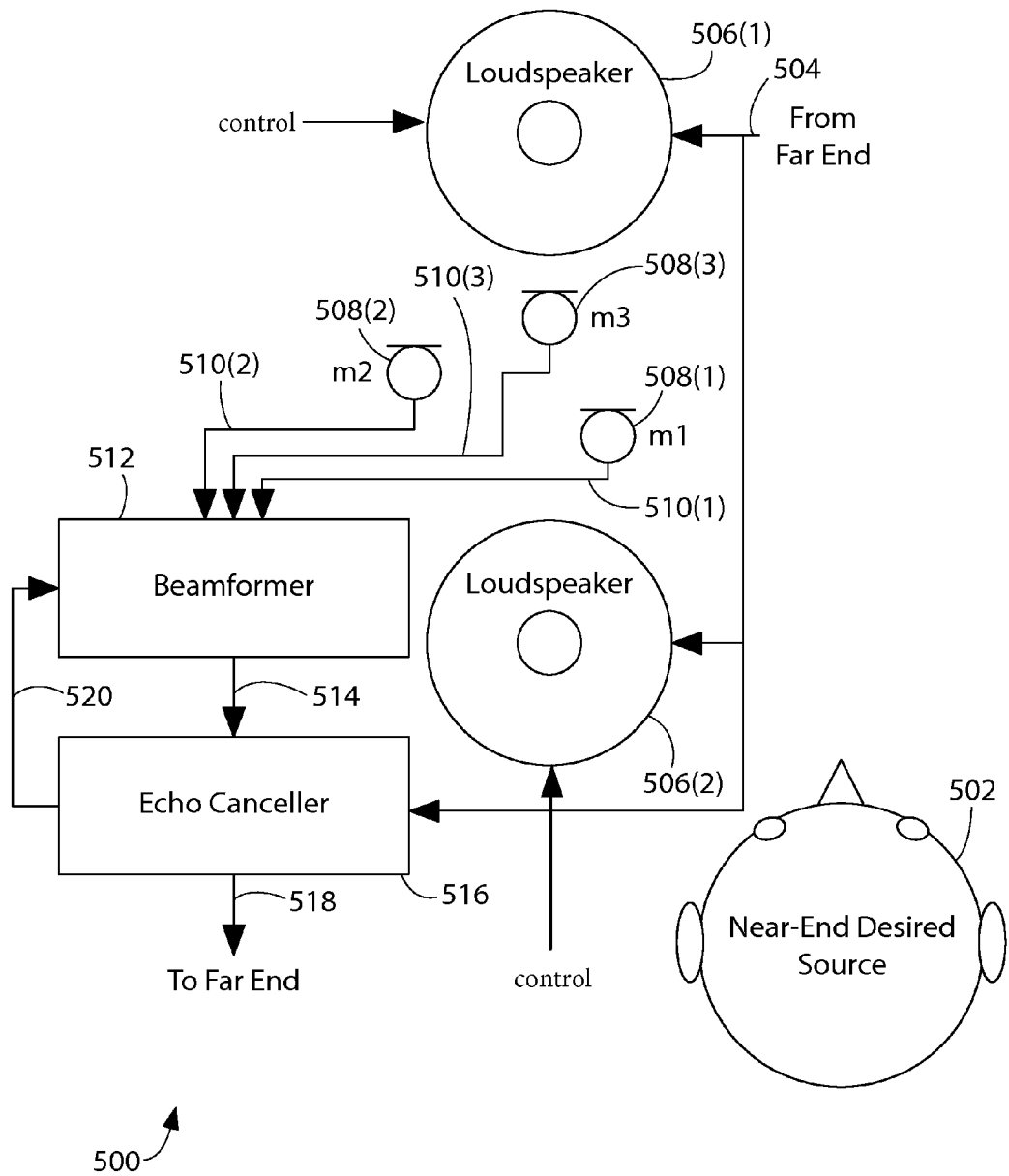
FIG. 5 shows a schematic block diagram of an audio system according to another embodiment of the disclosure.

FIG. 5 shows a schematic block diagram of an audio system 500 according to another embodiment of the disclosure. Like audio system 100 of FIG. 1, audio system 500 represents one half of a two-way audio communication channel between a near-end user 502 and a far-end user (not shown). Like audio system 100, audio system 500 receives an incoming signal 504 from the far-end user's equipment, representing acoustic signals occurring remotely at the far end, and audio system 500 generates an outgoing signal 518 for transmission to the far-end user equipment, representing acoustic signals occurring locally at the near end.

Like audio system 100, audio system 500 also has (a) a beamformer 512 that generates a beampattern signal 514 from microphone signals 510(1)-(3) and based on feedback signal 520 and (b) an echo canceller 516 that (i) compares that beampattern signal 514 to incoming signal 504 to control the beampattern employed by beamformer 512 and (ii) processes beampattern signal 514 to generate outgoing signal 518. Unlike audio system 100, audio system 500 has (i) two loudspeakers 506(1) and 506(2) instead of only one and (ii) three microphones 508(1)-508(3) instead of only two, where the three microphones form a triangular microphone array that is located between the two loudspeakers.

In one possible implementation, during the Far-End Only state and the Double-Talk state, beamformer 512 is configured to generate a beampattern having a single null that covers both loudspeakers 506. Note that, for optimal operation, the geometric center of the microphone array should be offset by the same angle from both loudspeakers. Such a triangular array enables a single, far-field axisymmetric null to cover both loudspeakers.

In the case of two loudspeakers reproducing different frequency content, e.g., a base-speaker and a tweeter, it could be advantageous to realize the beamformer in the frequency domain. This way, a low-frequency null can, for example, be steered towards the base speaker, and a high-frequency null towards the tweeter, thereby increasing the degrees of freedom for picking up the acoustic signals corresponding to the local talker.

Another potential solution for the geometry in FIG. 5 would be to disable one loudspeaker during double talk and configure the beamformer to form a beampattern with a null towards the other loudspeaker. An advantage of this solution would be that the beamformer configuration used to null the loudspeaker would potentially be similar to the beamformer configuration that is optimized for the near-end source. Thus, switching between these two beamformer configurations would not result in a significantly different audio quality for the transmitted near-end audio.

In addition to steering the microphone beam away from the loudspeakers for certain communication states, in some embodiments, the loudspeakers used in a loudspeaker array can be controlled to steer a resulting loudspeaker beam away from the microphones to further reduce the acoustic coupling between the loudspeakers and the microphones during those same (and/or other) communication states. In fact, one could combine the microphone and loudspeaker beamformers into a general combination beamformer where the optimization would be accomplished by adaptively adjusting both microphone and loudspeaker adaptive beamformer coefficients to minimize loudspeaker and microphone coupling. In the limit, as the number of beamformer taps becomes large, the solution of this general problem also solves the acoustic echo cancellation problem. However, even a relatively small number of beamformer taps can result in a significant reduction in loudspeaker-microphone coupling.

One additional operation that might be done to potentially improve the transmitted audio quality from the near-end source would be to compute an estimated frequency response of the optimized beamformer in the expected direction of the desired near-end source. It would then be possible to use this estimated frequency response to flatten the frequency response towards the desired near-end source.

Any temporal variation of the beampattern should be either explicitly controlled by the acoustic echo canceller or, at a minimum, communicate the change in state of the beamformer. One embodiment is to have the acoustic echo canceller control the beamformer state from the internal state machine that determines the active state of the audio communication channel. The optimization of the beamformer for the Far-End Only state would be to minimize the nearfield loudspeaker signal in the beamformer output. When the communication channel is in this state, both the beamformer and the acoustic echo canceller can be actively adapting. The adaptation rate could be different for both systems. Also, the beamformer can utilize the far-end signal in optimizing its beampattern since the beamformer now "knows" that the signal is to be minimized. It is important to constrain the beamformer so that a desired near-source direction is not nulled or distorted. This can be accomplished by, for example, inhibiting adaptation of the far-field beamformer's weights when the output of the echo canceller indicates the presence of the near-talker's speech.

The beamformer coefficients can also be used to compute an equalization filter for a known desired near-end source direction. By constraining the beampattern for the near-end talker, the audio quality of the near-end talker can be maintained when both sides are active. One possible constraint is to limit the frequency-response distortion of the acoustic signals from the near-end talker. An alternative or additional constraint might be to amplify or attenuate a desired talker to a desired level. If the beamformer is unconstrained, then it is possible that the adapted beampattern can also null the near-end talker, causing significant impairment to the quality of the near-end talker to the far-end user during double-talk conditions.

Although the three-element triangular array is a practical geometry for a steerable first-order microphone array, one could use higher-order beamformers with more microphone elements to relax some of the constraints on the beamformer design. Some distortion is allowable (in fact, some distortion is inevitable in full-duplex communication systems) in the near-end signal during double-talk, but the near-end signal should not be lowered in level or the far-end might not hear the near-end signal transmitted to the far end.

In general, the more microphones that are deployed in a system, and the more taps or weights in the beamformer, the more degrees of freedom will exist in the beamforming operation. If there are a sufficient number of microphones appropriately positioned and oriented, these additional degrees of freedom may enable a beampattern to be generated having an individual null directed at each different loudspeaker for the same frequency ranges. Thus, for example, if microphones 508 of FIG. 5 were appropriately positioned, beamformer 512 could generate a beampattern having a first null directed at loudspeaker 506(1) and a second null directed at loudspeaker 506(2) for the same frequency range in a stereo audio system. If more loudspeakers support additional audio channels, then deploying more microphones could enable additional nulls to be placed at those additional loudspeakers.

When the near-end is active and there is no far-end signal (or a very low far-end signal), the beamformer does not use the far-end signal and now optimizes the nearfield beampattern to maximize the SNR of the near-end source. This optimization can also be constrained to maximize the SNR for a known or computed direction of arrival for the near-end source. Thus, it is possible to allow the near-end source to move or have a direction that is not initially defined if the beamformer also computes the incident, desired source direction.

Many acoustic echo cancellers operate in the frequency domain. The same is true for acoustic beamformers. Thus, a complete acoustic front-end communication system can be built where all operations are performed in the frequency domain. Having all processing using the same underlying frequency-domain representation enables the beamformer and the acoustic echo canceller to share the analysis filterbanks, thereby simplifying the exchange of information and signals between the two processing algorithms.

SUMMARY

The present disclosure is related to an adaptive microphone array beamformer whose beampattern can be dynamically modified to significantly reduce loudspeaker acoustic coupling into the beamformer output. The beamformer is optimized to minimize acoustic coupling when either only the far-end source is active or when both the near- and far-end sources are simultaneously active. When the near-end desired source is solely active, the beamformer optimization is switched to maximize the audio quality (maximize SNR, for instance) of the beamformer output to the near-end source. The complete processing solution dynamically switches between different beampatterns depending on the communication channel state. During sole far-end source activity, the appropriately selected beamformer can significantly reduce the acoustic coupling between the loudspeaker(s) and the microphone array. Reducing the direct acoustic coupling can allow the acoustic canceller to operate with better echo cancellation performance as well as greatly enhancing the detection of near-talker speech, thus improving the duplexness of speech communications. The proposed technique is especially applicable for loudspeaker and microphone geometries when these transducers are in close proximity.

Broadening

Although the disclosure has been described in the context of particular audio systems having one or two loudspeakers and two or three microphones, in general, the disclosure applies to suitable audio systems having one or more loudspeakers (or other suitable transducers for converting an incoming signal into local acoustic signals) and one or more microphones (or other suitable transducers for converting local acoustic signals into an electromagnetic (e.g., electrical or optical) signal).

Similarly, although embodiments have been described that have microphone arrays for which a beamformer generate a microphone beampattern having a single null, it will be understood that alternative microphone arrays can be employed that enable beamformers to generate microphone beampatterns having two or more nulls. For example, the microphone array could have one or more rings of cardioid microphone elements, where each cardioid null points toward the center of its ring.

The present disclosure has been described in the context of audio systems having an echo canceller that generates a feedback control signal to control the beamforming processing of a beamformer. In alternative implementations, the beamformer can be configured to simultaneously generate two (or more) different beampattern signals and provide all of them to the echo canceller, which simply selects the appropriate beampattern signal for the detected current audio communication state, without having to generate a feedback control signal that is fed back to the beamformer.

Though the present disclosure has been described in the context of speech communications, where the signals of interest are near-end and far-end speech, it is understood that the signals of interest can originate from any acoustic or synthetic audio source, for example, music, television, and media streams. For example, the system of microphone(s), loudspeaker(s), beamformer(s), and echo canceller(s) presented herein could be used in the application of voice-interactive "Internet" television and video terminals, where the predominate use is not only for two-way speech communications (voice and video calls) but also for the reduction of acoustic echo and enhancement of near-talker speech for voice-controlled television and media-services interaction.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. Near-end equipment for a near-end audio source communicating with a far-end equipment via an audio communication channel, the near-end equipment comprising:
   a beamformer configured to receive two or more microphone signals generated by two or more local microphones and generate one or more beampattern signals; and
   an echo canceller configured to
      (i) receive the one or more beampattern signals from the beamformer and an incoming signal from the far-end equipment that is applied to one or more local loudspeakers,
      (ii) determine an active communication state for the audio communication channel,
      (iii) select a beampattern for the beamformer based on the determined active communication state, and
      (iv) apply echo-cancellation processing to a beampattern signal corresponding to the selected beampattern for the beamformer, to generate an outgoing signal to be transmitted to the far-end equipment,
   wherein:
   active communication states comprise a near-end only talking state, a far-end only talking state, and a double-talk state;

one or more beampatterns comprise a first beampattern and a second beampattern different from the first beampattern;

the first beampattern has at least one near-field null corresponding to the one or more local loudspeakers and a far-field pattern that does not contain any nulls;

the second beampattern optimizes reception of acoustic signals from the near-end audio source;

when the echo canceller determines that the active communication state is the far-end only talking state or the double-talk state, the echo canceller selects the first beampattern;

when the echo canceller determines that the active communication state is the near-end only taling state, the echo canceller selects the second beampattern;

wherein the beamformer is configured to generate a first beampattern signal for a first communication state; and the echo canceller is configured to
(i) detect a change from the first communication state to a second communication state different from the first communication state and
(ii) control the beamformer to be re-configured to generate a second beampattern signal different from the first beampattern signal for the second communication state.

2. The near-end equipment of claim 1, wherein:
the beamformer simultaneously generates first and second beampattern signals corresponding to the first and second beampatterns; and
the echo canceller selects one of the first and second beampattern signals as the beampattern signal corresponding to the selected beampattern.

3. The near-end equipment of claim 1, wherein the near-end equipment further comprises the one or more local loudspeakers and the two or more local microphones.

4. The near-end equipment of claim 3, wherein at least one of the two or more local microphones is
(i) located inside housing of one of the one or more local loudspeakers and
(ii) configured to be used to reduce audio coupling between the one or more local loudspeakers and the two or more local microphones during at least one determined active communication state.

5. The near-end equipment of claim 1, wherein the beamformer is configured to concurrently generate different beampattern signals for two or more different frequency bands of the two or more microphone signals.

6. The near-end equipment of claim 5, wherein the beamformer is configured to concurrently generate:
a first beampattern signal for a first frequency band of the two or more microphone signals having a null directed towards a first loudspeaker; and
a second, different beampattern signal for a second, different frequency band of the two or more microphone signals having a null directed towards a second, different loudspeaker.

7. The near-end equipment of claim 1, wherein:
the one or more local loudspeakers comprises at least a first local loudspeaker and a second local loudspeaker; and
the beamformer is configured to generate a beampattern signal having a first null directed towards the first local loudspeaker and a second null directed towards the second local loudspeaker.

8. The near-end equipment of claim 1, wherein:
there are two or more local loudspeakers; and
the near-end equipment is configured to control the two or more local loudspeakers to generate a loudspeaker beampattern based on the determined active communication state.

9. The near-end equipment of claim 8, wherein the near-end equipment is configured to steer the loudspeaker beampattern away from the two or more local microphones for at least one determined active communication state.

10. The near-end equipment of claim 1, wherein the far-field pattern of the first beampattern is a far-field omnidirectional pattern.

* * * * *